(12) United States Patent
Gazzard (10) Patent No.: US 8,155,629 B2
(45) Date of Patent: Apr. 10, 2012

(54) SYSTEM AND METHOD FOR PROVIDING INFORMATION SERVICES TO SUBSCRIBERS IN A GPRS NETWORK

(75) Inventor: Daryl Gazzard, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 756 days.

(21) Appl. No.: 12/255,398

(22) Filed: Oct. 21, 2008

(65) Prior Publication Data

US 2009/0043820 A1 Feb. 12, 2009

Related U.S. Application Data

(63) Continuation of application No. 10/603,650, filed on Jun. 26, 2003, now Pat. No. 7,444,136.

(51) Int. Cl.
*H04M 3/42* (2006.01)

(52) U.S. Cl. .................... 455/414.1; 455/414.2; 455/561

(58) Field of Classification Search ............... 455/414.1, 455/414.2, 414.3, 550.1, 419, 418, 566, 561; 709/204–205; 370/352

See application file for complete search history.

(56) References Cited

U.S. PATENT DOCUMENTS

| 5,579,535 A * | 11/1996 | Orlen et al. ................... 455/421 |
| 2003/0036379 A1* | 2/2003 | Nikolai et al. ................ 455/414 |
| 2004/0203900 A1* | 10/2004 | Cedervall et al. .......... 455/456.1 |

* cited by examiner

*Primary Examiner* — Melur Ramakrishnaiah (74) *Attorney, Agent, or Firm* — Moazzam & Associates, LLC (57) ABSTRACT

The present invention is directed to a system and method for providing services, such as location-based services, in a GPRS network. In a preferred embodiment of the present invention, a database including local geographical information is stored in a BSS (Base Station System). The BSS transmits data in the database to at lease one MS on dedicated DPCHs in idle packet frames. The MS populates its database with the data while in idle mode and provides the location-based services to a subscriber using its database.

28 Claims, 4 Drawing Sheets

SYSTEM AND METHOD FOR PROVIDING INFORMATION SERVICES TO SUBSCRIBERS IN A GPRS NETWORK

BACKGROUND OF THE INVENTION

1. Field of the Invention

The present invention relates generally to communication systems and, more particularly, to providing services, such as location-based services, in such communications systems.

2. Description of Related Art

As is well known, location-based services in a GPRS (General Packet Radio Service) network provide services to subscribers based on their current geographic location. The location-based services blend information about a person's location with other useful content, providing relevant, timely and local information to subscribers when and where it is needed. For example, location-based services can provide information about weather, traffic, restaurants, or retail stores, based on a subscriber's location at a particular moment in time.

GPRS is an extension to GSM (Global System for Mobile communication) technology. GPRS introduces packet switching to GSM networks. GPRS is a packet-based wireless communication technology that increases data rates of existing GSM networks and provides continuous connection to the internet for subscribers, such as mobile telephone and computer users. GPRS enables services such as color Internet browsing, e-mail "on the move," powerful visual communications, and multimedia messages, in addition to the location-based services.

Figure 1:
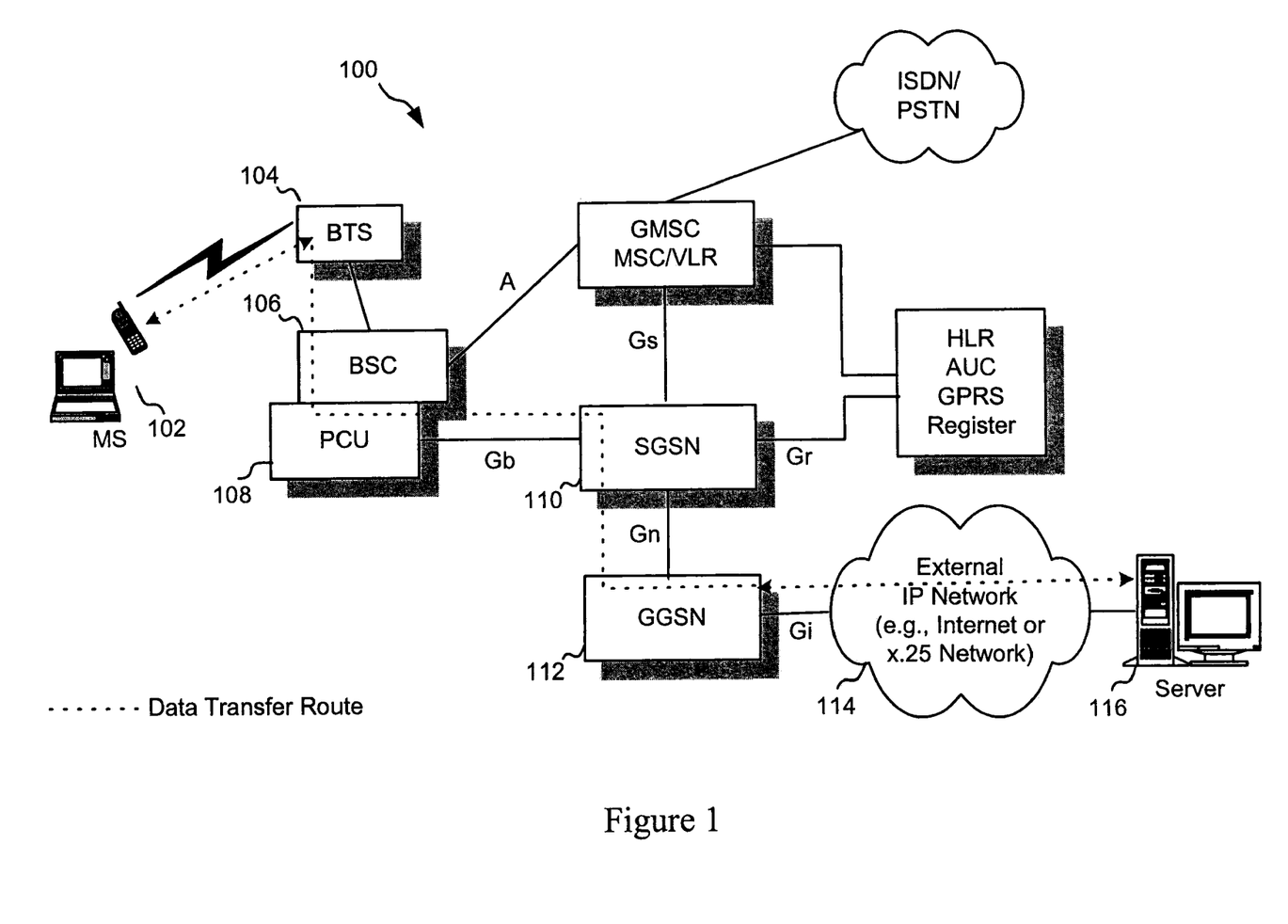
FIG. 1 is a diagram illustrating a GPRS network architecture and a data transfer route in the GPRS network.

FIG. 1 shows a GPRS network architecture and a data transfer route in the GPRS network. The GPRS telecommunications network 100 includes a GGSN 112 (gateway GPRS support node) and a SGSN 110 (serving GPRS support node). The GGSN provides a gateway between the GPRS network and a public packet data network (PDN) or other GPRS networks. The GGSN provides interworking functionality with external packet data networks, acts as an access server, and sets up a logical link to a MS (mobile station) 102 through the SGSN. The MS is physical equipment, such as a mobile phone or laptop computer, used by mobile subscribers. When packet-switched data leaves the GPRS network, it is transferred to TCP-IP networks, such as X.25 or Internet 114. The SGSN controls the connection between the network and the MS. The SGSN provides session management and GPRS mobility management functions, such as handovers and paging. A PCU 108 converts packet data from the SGSN into a format that can be transferred to the MS and implements quality of service (QoS) measurements. A BSC 106, which is linked to the PCU, manages radio resources including a BTS (Base Transceiver Station) 104. The BTS is physical equipment, such as a radio tower, that is used to transmit radio frequencies over an air interface. The BSC may be connected to several BTS's. Each BTS may serve more than one MS. The BSC and BTS components, as a whole, are generally referred to as a BSS (Base Station System).

To initiate packet data transfer, first, the MS attaches itself to the GPRS network, and then activates a PDP (packet data protocol) context, thus activating a packet communication session between the MS, the SGSN and the GGSN. During the activation procedure, the MS either provides a static IP address or is provided with a temporary IP address from the GPRS network. The MS also specifies an APN (access point name). The APN provides routing information for SGSN and GGSN. The APN identifies the external service requested by a subscriber and specifies routing information. The MS requests a desired quality of service (QoS) and a NSAPI (network service access point identifier). The NSAPI is used to identify the data packets for a specific application since the MS can establish multiple PDP context sessions for different applications. Upon receiving information from the MS, the SGSN determines which GGSN is connected to the specified APN and forwards the request (i.e., IP data). Once the communication and activation procedure at the GGSN is successful, the IP data is transferred to external IP network 114 and to a server 116, and the appropriate response is forwarded to the MS from the server. During data transfer, the sending side (either the MS or the network) transmits blocks within a window, and the receiving side sends a packet uplink ack/nack (acknowledged/not acknowledged) or packet downlink ack/nack message, as needed.

The GPRS uses the existing GSM resources, such as spectrum, channels, and timeslots. The GPRS users share the same TDMA (Time Division Multiplexed Access) frame with the GSM voice users, thus increasing capacity requirements. Each TDMA frame is divided into eight consecutive slots of equal duration. To a certain extent, the GPRS takes care of increased capacity demand by multiplexing multiple users on the same physical channels (i.e., timeslots). Additionally, the GPRS dynamically allocate resources (i.e., timeslots) for voice and PDCHs (packet data channels).

Figure 2:
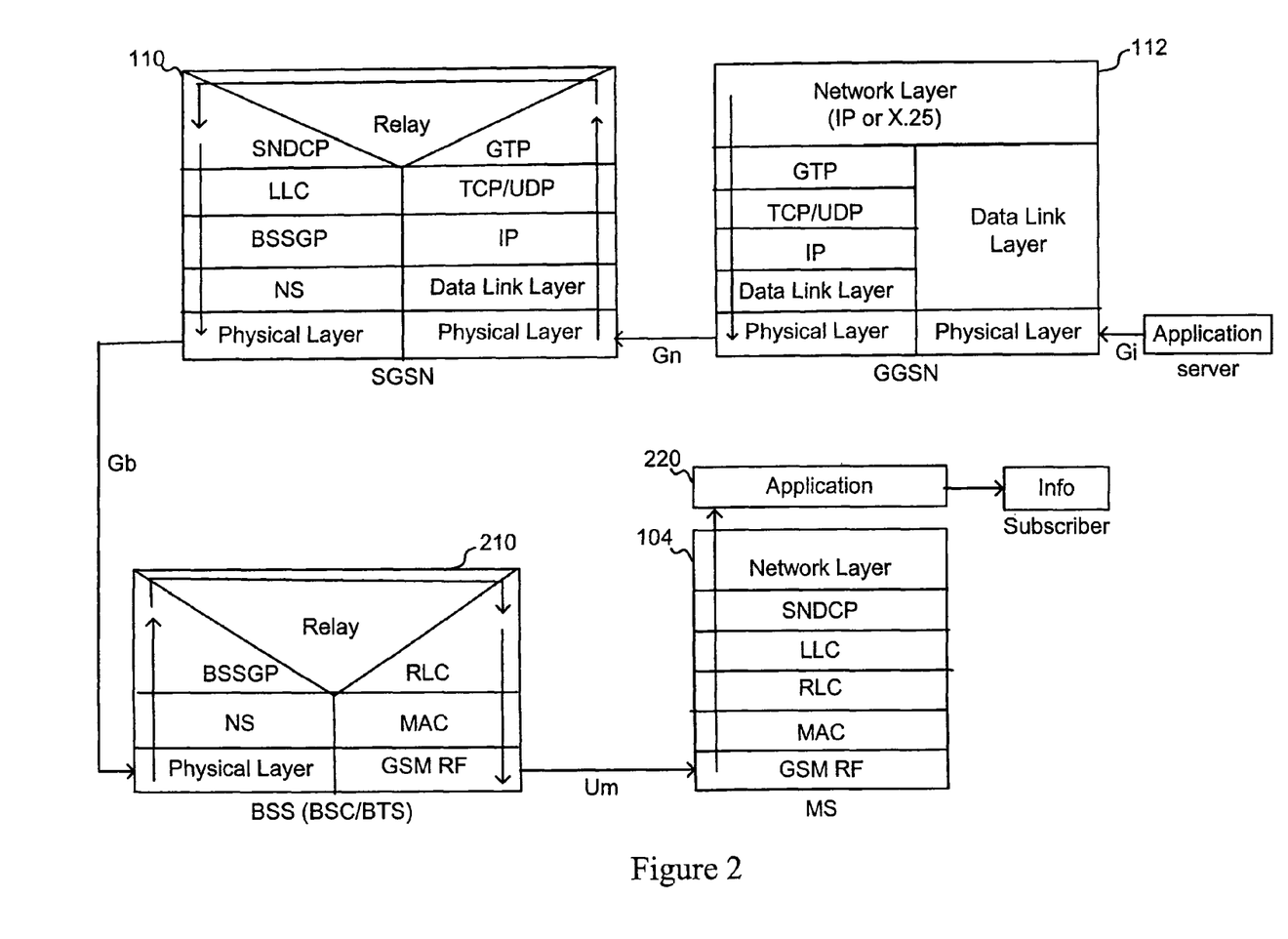
FIG. 2 is a diagram illustrating a GPRS data and signaling transmission plane.

FIG. 2 shows a GPRS data and signaling transmission plane. For example, assume that a subscriber in a taxi requests a location-based service using a GPRS mobile phone (i.e., MS 102), and a server provides the service. As shown in FIG. 1, the request is transferred to the BTS and the BSC, the PCU, the SGSN, and the GGSN. Thereafter, the request is forwarded to the Internet and then to the server. In response to the subscriber's request, the data is traveled from the Internet to GGSN 112, then to SGSN 110, to BSS 210 (i.e., BSC 106 and BTS 104), and finally to MS 104 (in this case, the subscriber's GPRS mobile phone). An application layer of the server generates an IP datagram and sends it across the external data communication network, such as IP or X.25, to GGSN 112. When the IP datagram arrives at the GGSN, it is called an N-PDU (network packet data unit) and it is addressed to a particular IP address. The GGSN maps each IP address to a GTP (GPRS Tunneling Protocol) identity. The data is passed down the GGSN protocol stack, as shown in FIG. 2, then transported over a physical layer of Gn interface to SGSN 110.

At SGSN 110, the N-PDU is relayed to a SNDCP (sub network dependent convergence protocol). The SNDCP compresses and segments the packet and sends the PDU to a LLC (logical link control) layer. The LLC layer provides a highly reliable logical connection between the SGSN and the MS. The LLC layer encapsulates the PDU in an LLC frame with its own header. The LLC header adds control information, frame check sequence, and SAPI (service access point identifiers) values. The data is then sent over a physical layer of Gb interface to the BSS 210, which encompasses BSC 106 and the BTS 104.

Next, a BSSGP (BSS GPRS protocol) layer at BSS 210 sends all of the information to a RLC (radio link control) layer. The RLC layer segments the LLC frames into smaller RLC blocks. A group of the LLC frames, which has been segmented into smaller blocks, is known as a TBF (temporary block flow). The TBF is assigned a TFI (temporary flow identity), and the RLC layer adds a header to the data blocks containing the TFI. A MAC (medium access control) layer controls the access signaling including assignment of uplink and downlink blocks. The MAC layer adds its own header, which is monitored by the MS. During the data transmission, the RLC/MAC messages will include the TFI in one of the fields to identify the receiving MS.

Thereafter, the data is transmitted over an air interface (i.e., Um) to the MS via a physical layer, GSM RF. Finally, the original information from the server is received at an application layer 250 by the mobile user (i.e., the subscriber).

As shown, the location-based services, like all other GPRS services, rely on accessing and utilizing centrally based services on a LAN or on the Internet, which results in a large quantity of data passing through the GSM/GPRS network. Further, to support the large quantity of data, the IP backbone/infrastructure has to be large. Otherwise it will result in poor performance across the network.

Accordingly, there is a need for providing GPRS services, such as the location-based services, without resulting in having such a large quantity of data communicated over the GSM/GPRS network.

SUMMARY OF THE INVENTION

The present invention is directed to a low cost and a low network impact solution for providing services utilizing a GPRS network. The present invention provides a system and method for providing services, such as location-based services, in a GPRS network without relying upon accessing and utilizing centrally based services on the Internet, thus reducing the data traffic across the network. The present invention provides a system and method for delivering information that is specific to a subscriber's location to the subscriber's user equipment, such as a mobile phone. The present invention provides an improved system and method for providing location-based services.

In the present invention, a BTS includes a storage area that contains a database including information needed to provide location-based services. The BTS transmits data in the database to at least one MS on dedicated PDCHs (packet data channels) in idle packet frames. The application on the MS listens to downlink transmission from the BTS for data packets containing the data of the database. When the data packet containing the data of the database is located, the MS initiates downlink packet data transfer and populates its database with the data of the database while in idle mode.

Once its database is completely populated, the MS stops listening to the downlink transmission until the MS moves to a different geographical area. Upon moving to the different geographical area, the MS listens to the downlink transmission again and refreshes its database with the new database information specific to the current location. The subscriber can obtain the information specific to the subscriber's current location from the MS (i.e., the subscriber's user equipment), without overhead to the network. The application on the MS can be operated without receiving the full database. The BTS may transmit the database to multiple MSs.

DETAILED DESCRIPTION OF THE INVENTION

Reference will now be made in detail to the preferred embodiments of the present invention, examples of which are illustrated in the accompanying drawings.

The present invention provides an improved system and method for providing services, such as location-based services, in a GPRS communications network. Specifically, the present invention provides a system and method for providing services in a GPRS network without relying upon accessing the services on the Internet, thus conserving network resources. For purposes of illustration and description, a system and method for providing location-based services is described below. However, this invention is not limited to providing location-based services.

In the present invention, a database that includes information needed to provide the location-based services, such as local geographical information, is stored in BSSs, preferably in BTSs. The data in the database is then transmitted to at least one MS (i.e., a subscriber's user equipment) on dedicated PDCHs. The data packet of the database is transmitted in idle frames on the PDCHs. Each MS receives the data packets and populates its database with the data of the database. Since the data packets are transmitted in the idle frames on a dedicated PDCH, the database of the MS can be populated while the MS is in an idle mode, without requiring PDP context activation. The subscriber can access the database in the MS to obtain information that is specific to the subscriber's location, such as a nearest restaurant or retail store, without transmitting or receiving the information cross the GMS/GPRS network and the internet. This minimizes network involvement, thus reserving network resources. Further, since the database is stored in the MS, the information requested by the subscriber can be instantly accessed.

Figure 3:
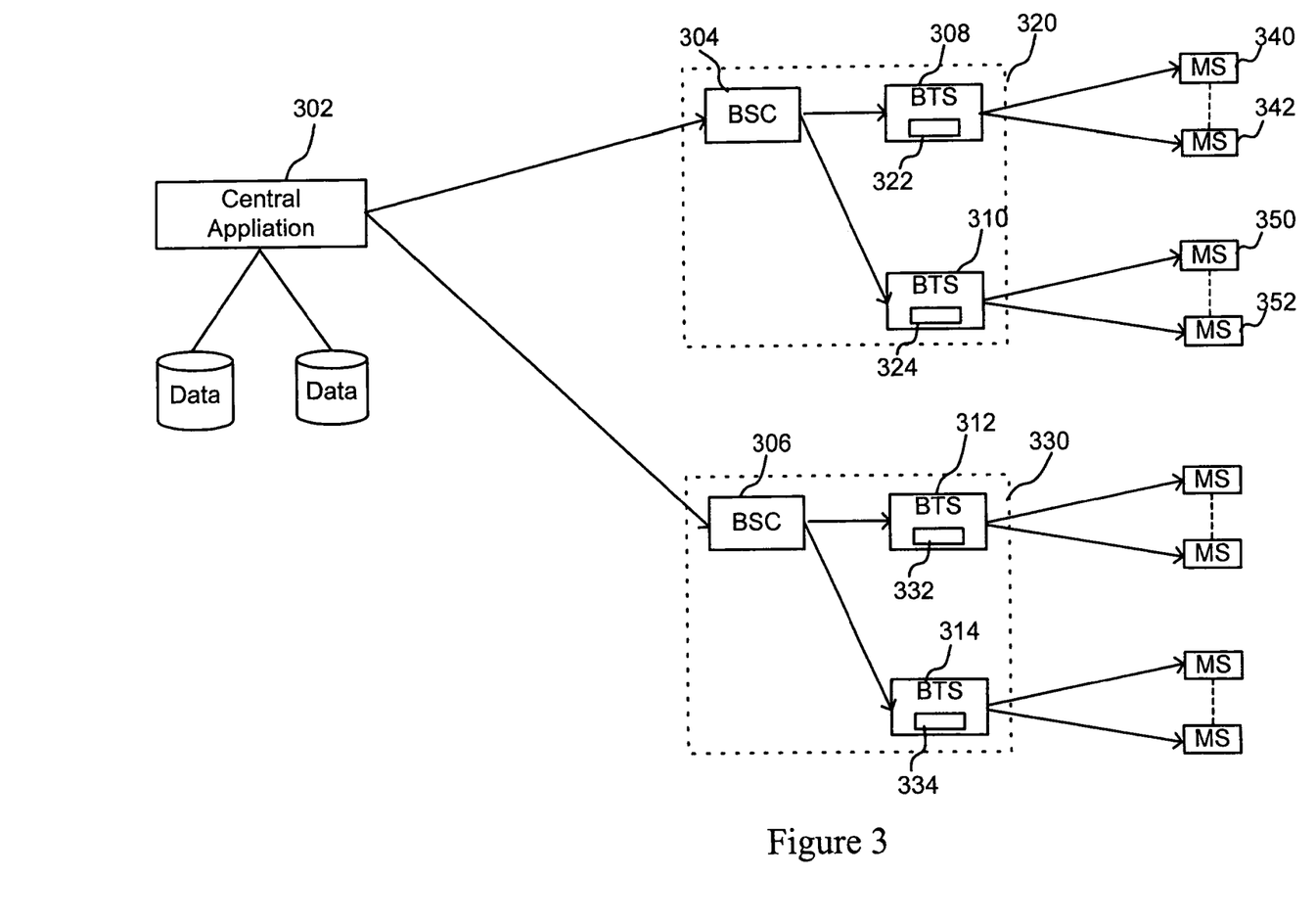
FIG. 3 is a diagram illustrating a configuration of a system according to a preferred embodiment of the present invention.

FIG. 3 shows a configuration of a system according to a preferred embodiment of the present invention. A central application 302 that manages databases containing the information needed to provide the location-based services is in communication with BSSs, such as a BSS 320 and a BSS 330. The databases, for example, include information relating to the geographic area in terms of services and addresses, and cellular information in terms of geographical location. Each BSS includes at least one BTS and a BSC for managing the BTSs. BSS 320, for example, includes a BSC 304, a BTS 308 and a BTS 310. Each BTS includes a storage area that can be accessed and modified by the central application. For example, BTS 308 includes a storage area 322 and BTS 310 includes a storage are 324. The central application accesses the storage areas and modifies the storage areas to include the databases having information that is needed to provide the location-based services. Each BTS serves at least one MS.

The BTS then transmits data in the database to at least one MS. For example, BTS 308 transmits data in a database stored in storage area 322 to MS 340 and MS 342, and BTS 310 transmits data in a database stored in storage area 324 to MS 350 and MS 352.

The data in the database is progressively transmitted from the BTS to the MS in idle frames on the dedicated PDCH. The following example illustrates how the data in the database is transmitted to the MS.

In this example, TN0 is a dedicated packet data channel (PDCH) and TN1 is being allocated on demand, and there are two users transferring data (i.e., Data1 and Data2). A conventional TDMA frame may be allocated as follows.

| Burst | 1 | 2 | 3 | 4 | 5 | 6 | 7 | 8 | TN0 |
|---|---|---|---|---|---|---|---|---|---|
| Content | Data1 | Data1 | Idle | Data2 | Data2 | Data2 | Idle | Data1 | |
| Burst | 1 | 2 | 3 | 4 | 5 | 6 | 7 | 8 | TN1 |
| Content | Data1 | Data1 | Idle | Data2 | Data2 | Idle | Idle | Data1 | |

With the present invention, the same TDMA frame would be allocated as follows.

| Burst | 1 | 2 | 3 | 4 | 5 | 6 | 7 | 8 | TN0 |
|---|---|---|---|---|---|---|---|---|---|
| Content | Data1 | Data1 | DB | Data2 | Data2 | Data2 | DB | Data1 | |
| Burst | 1 | 2 | 3 | 4 | 5 | 6 | 7 | 8 | TN1 |
| Content | Data1 | Data1 | Idle | Data2 | Data2 | Idle | Idle | Data1 | |

On the fixed PDCH (i.e., TN0), parts of the database (DB) (i.e., the database that can be used by an application in the MS) are transmitted in the frame that would have been idle (i.e., bursts 3 and 7). If both TN0 and TN1 were dedicated, then all idle bursts in both TN0 and TN1 would be used.

The MS receives the data packets and populates its database. To receive data of the database transmitted from the BTS, the MS first attaches itself to the GPRS network, and activates a PDP context. The PDP context enables a packet communication session. During the activation procedure, the MS either provides a static IP address or requests a temporary one from the network. Once this is established, the application of the MS can receive the TFI (temporary flow identifier) reserved for the downlink data (i.e., the database). The application of the MS may also receive other information, such as a size of the database, data relating to the breakup of the database, and ciphering information. Once all the information has been received, the MS may deactivate the PDP context, thus freeing up resources.

The MS then listens to the messages transmitted in the downlink direction that contain the allocated TFI. Since the MS is aware of TDMA frame(s) that is dedicated to the PDCHs, the MS monitors those channels for the data packets containing database information. Once the data packets containing database information is located, the downlink packet data transfer is performed. Acknowledgement or handshake with the network is not needed. If a packet is missed or can not be interpreted, the MS can attempt the downlink packet data transfer again the next time the packet is sent.

During the packet data transfer, one RLC/MAC block may be mapped onto one LLC frame. Alternatively, more than one RLC/MAC block may be mapped onto one LLC frame. Preferably, one RLC/MAC block is mapped onto one LLC frame since non-decoded RLC/MAC block has less impact on the downloaded database. If more than one RLC/MAC block is mapped onto one LLC frame, the RLC/MAC blocks can be sent in repetitions, rather than as a continuous stream (i.e., one block followed by the next occurring block). For example, if RLC/MAC blocks—a, b, c, d, e—are to be transmitted, the RLC/MAC block bursts a-b-c-d-e may be transmitted as a-a-b-b-c-c-d-d-e-e. This enables the MS to have another chance to decode the data packet in the second burst if the MS fails to decode the data packet in the first burst. The NSAPI value for the local database information is fixed for the application and passed to the MS during the PDP context activation.

Once the MS populates its database, the MS stops listening, even though the BST continues to transmit. The MS does not repopulate its database until the MS moves to a different location. Upon moving to the different location, the MS listens again and refreshes its database with new information specific to the current location.

The configuration of the database and how the database is stored in the BTS impact the throughput and complexity of the application on the base station (i.e., BTS). For example, if the database is stored in RLC/MAC ready packets, the application on BTS can simply slot the packets onto the idle frames. If the relationship between RLC/MAC blocks and LLC frames is not one-to-one relationship, the alternative transmit patterns, such as packet duplication, may be adopted.

If the database is stored in "raw form," then the BTS may be modified to add functionality to manipulate the database into data packets that can be transmitted to the MS. The advantage of this is that an operator is able to control the formatting of the transmitted information at the BTS level, regardless of, for example, whether there is a one-to-one relationship or retransmit schemes. This allows optimization at the BTS/radio level.

The confidentiality of the transmission can be arranged with ciphering. The ciphering is executed at the physical layer as a bit per bit ciphering. To ensure that the ciphering key Kc is known only by the MS and the mobile station network, the transmission of the ciphering key from the BTS to the MS is indirect. The calculation and storing of the ciphering key Kc are executed both in the MS and in the network, i.e. BTS. The ciphering can be set up at the PDP context activation. Once the MS has released its resources and invoked a PDP context deactivation, the MS can switch to receive the data packets using the ciphering key Kc. If the MS continuously fails to decipher data packet contents, the PDP context activation can be reinitiated to receive the ciphering key again. The application on the MS provides location-based services to the subscriber using the database in the MS. For example, the application on the MS can provide a basic map of the area or listings based on search criteria, such as a business type, or can provide the exact details for an entered business name. The database in MS can be used without receiving the complete data of the database stored in the BTS. Further, combined with location/positioning, the application can provide directions. The MS may also store the received databases as it passes through different areas, rather than replacing the database with the new information, thus giving the end user (i.e., subscriber) access to larger amounts of information.

The roaming can be achieved by implementing APN standards so that a roamer is pointed to the network's application server when roaming. When the application detects a roaming subscriber, the application triggers the MS to perform a supplemental PDP context activation towards the local networks APN. Then, the MS can receive the information, such as a local ciphering and a TFI. The actual TFI and ciphering information could be stored within the network, not at the application level, so that the data could be passed from within the network, i.e., at the same level as the database storage.

Figure 4:
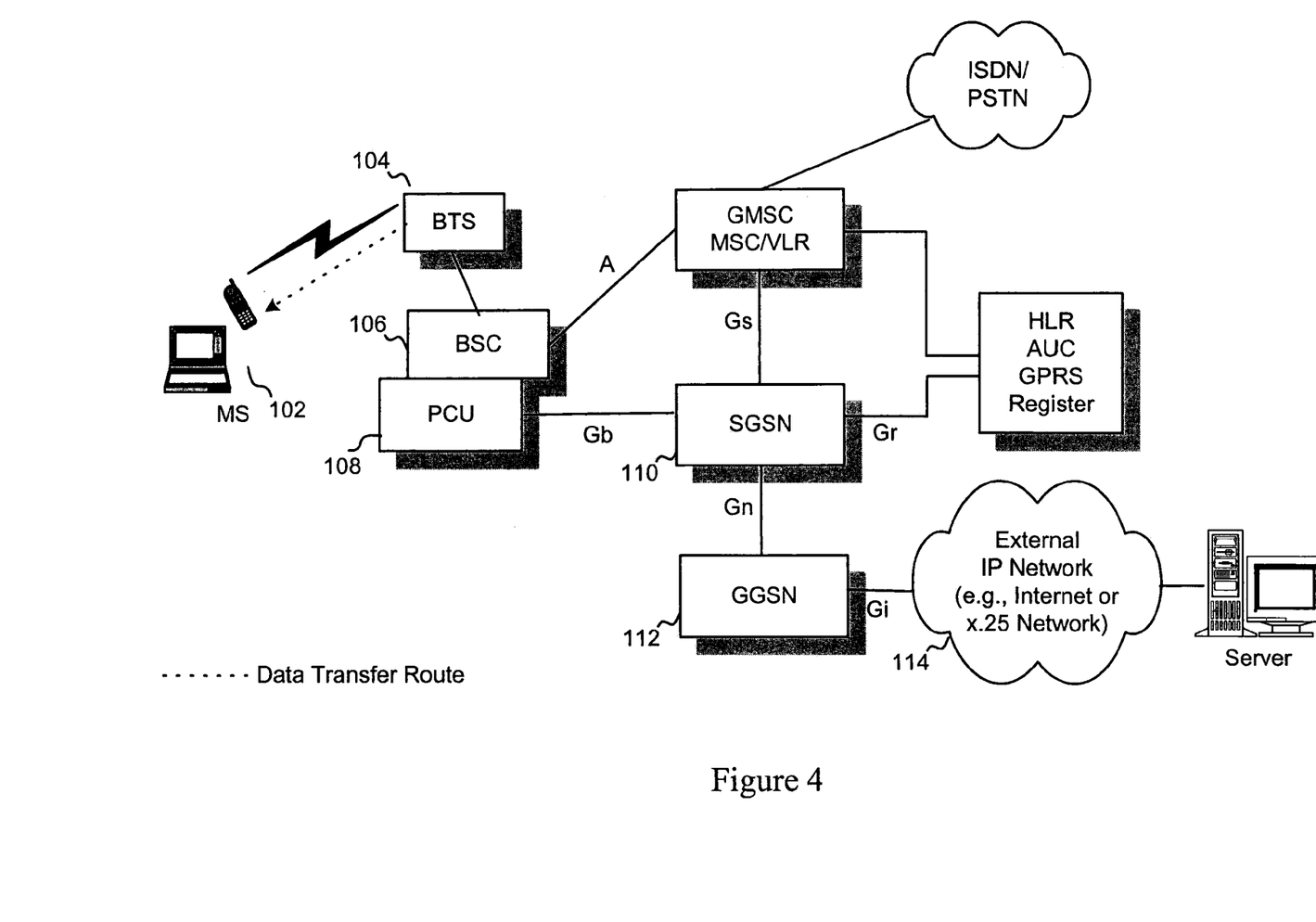
FIG. 4 is a diagram illustrating a data transfer route according to a preferred embodiment of the present invention.

FIG. 4 illustrates a network allocation with data transfer according to the present invention. As shown, the database is transmitted from the BTS to the MS and the location-based services are provided by the MS without communicating over the GPRS network or the Internet.

The present invention can be combined with a fully interactive information service. For example, if the information requested by the subscriber is not contained in within the local area database, then a fully interactive mode could be initiated to provide the requested information.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. A mobile station for use by a subscriber for communicating with a telecommunications network comprising a plurality of distributed base station systems each configured to transmit data including both location-based data and user data within a location, the mobile station comprising:
    an idle mode of operation during which the mobile station has no activated data communication sessions with the telecommunications network, the mobile station being movable between the locations of the plurality of distributed base station systems;
    means for receiving location-based data transmitted within the locations of the plurality of distributed base station systems whereat the mobile station is located when the mobile station is operating in idle mode; and
    means for using the location-based data received at a present location of the mobile station to provide location-based services to the subscriber;
    means for activating a data communication session with the telecommunications network to obtain an identifier associated with the location-based data transmitted by one of the plurality of distributed base station systems within the present location of the mobile station;
    means for deactivating the data communication session after obtaining the identifier; and
    means for identifying the location-based data associated with the identifier within the data transmitted by the one of the plurality of distributed base station systems transmitting location-based data within the present location of the mobile station while operating in idle mode.

2. The mobile station of claim 1, further comprising:
    means for storing the location-based data received at the present location of the mobile station.

3. The mobile station of claim 1, further comprising:
    means for replacing any location-based data received previously at a different location with location-based data received at the present location of the mobile station.

4. The mobile station of claim 1, for use by a subscriber for communicating with a telecommunications network comprising a plurality of distributed base station systems each configured to transmit data within a location on a plurality of channels comprising dedicated packet data channels, the data including both the location-based data and user data, the mobile station further comprising:
    means for identifying the dedicated packet data channels of the plurality of channels transmitted by the one of the plurality of distributed base station systems transmitting data within the present location of the mobile station; and
    means for monitoring the identified dedicated packet data channels for the identifier while operating in idle mode.

5. The mobile station of claim 4, further comprising:
    means for terminating the monitoring of the identified dedicated packet data channels for the identifier after the location-based data has been received from the one of the plurality of distributed base station systems transmitting data in the present location of the mobile station.

6. The mobile station of claim 5, further comprising:
    means for identifying the dedicated packet data channels of the plurality of channels on which data is transmitted by a different one of the plurality of distributed base station systems after the mobile station has been moved to a new location in which the different one of the plurality of distributed base station systems is transmitting data; and
    means for resuming the monitoring of the identified dedicated packet data channels on which data is transmitted by the different one of the plurality of distributed base station systems for the identifier while operating in idle mode.

7. The mobile station of claim 1, wherein the location-based services comprise providing a map of at least a portion of the present location at which the mobile station is located.

8. The mobile station of claim 1, wherein the location-based services comprise providing information associated with a business located within the present location at which the mobile station is located.

9. The mobile station of claim 1, wherein the location-based services comprise providing directions to a destination.

10. A telecommunications network comprising:
    a plurality of distributed base station systems each configured to transmit data within a location, the data including both the location-based data and user data; and
    a plurality of mobile stations each operable in an idle mode of operation during which the mobile station has no activated data communication sessions with the telecommunications network, each of the plurality of mobile stations being movable between the locations of the plurality of distributed base station systems and configured to:
    receive location-based data transmitted within the locations of the plurality of distributed base station systems whereat the mobile station is located when the mobile station is operating in idle mode; and
    use the location-based data received at a present location of the mobile station to provide the location-based services to the subscriber;
    wherein each of the plurality of distributed base station systems is configured to:
    transmit data on a plurality of channels comprising dedicated packet data channels each comprising time slots a first portion of which are in use and a second portion of which are idle; and
    transmit the location-based data in one or more of the first portion of time slots and at least a portion of the user data in one or more of the second portion of time slots.

11. The telecommunications network of claim 10, wherein each of the plurality of mobile stations is configured to activate a data communication session with the telecommunications network to obtain an identifier associated with the location-based data transmitted by one of the plurality of distributed base station systems within the present location of the mobile station and after obtaining the identifier, deactivate the data communication session; and  while operating in idle mode, each of the plurality of mobile stations being further configured to use the identifier to identify the location-based data within the first portion of time slots transmitted by one of the plurality of distributed base station systems within the present location of the mobile station.

12. The telecommunications network of claim 10, wherein the location-based data transmitted by the plurality of distributed base station systems comprises local geographical information.

13. The telecommunications network of claim 10, wherein for each of at least a portion of the plurality of mobile stations, the location-based services comprise providing a map of at least a portion of the present location at which the mobile station is located.

14. The telecommunications network of claim 10, wherein for each of at least a portion of the plurality of mobile stations, the location-based services comprise providing information associated with a business located within the present location at which the mobile station is located.

15. The telecommunications network of claim 10, wherein for each of at least a portion of the plurality of mobile stations, the location-based services comprise providing directions to a destination.

16. The telecommunications network of claim 10, wherein the plurality of distributed base station systems each store the location-based data transmitted by the base station system locally.

17. The telecommunications network of claim 16, wherein the location-based information is stored locally by each of the plurality of distributed base station systems in a database residing in the base station system.

18. The telecommunications network of claim 10, further comprising:
 a central application configured to provide location-based information to each of the plurality of distributed base station systems for storage and transmission thereby.

19. The telecommunications network of claim 10, wherein each of the plurality of distributed base station systems is configured to:
 transmit data in Time Division Multiplexed Access ("TDMA") frames over dedicated packet data channels and channels allocated on demand, at least a portion of the TDMA frames transmitted over the dedicated packet data channels comprising an idle portion; and
 transmit the location-based data in one or more of the idle portions of the TDMA frames transmitted over the dedicated packet data channels.

20. The telecommunications network of claim 10, wherein each of the plurality of distributed base station systems is configured to transmit an identifier with the location-based data,
 each of the plurality of mobile stations is configured to activate a data communication session with the telecommunications network to obtain the identifier associated with the location-based data transmitted by one of the plurality of distributed base station systems within the present location of the mobile station and after obtaining the identifier, deactivate the data communication session, and
 each of the plurality of mobile stations is further configured to use the identifier to identify the location-based data within the data transmitted by the one of the plurality of distributed base station systems within the present location of the mobile station.

21. The telecommunications network of claim 10, each of the plurality of mobile stations is further configured to store the location-based data received at the present location of the mobile station.

22. The telecommunications network of claim 10, each of the plurality of mobile stations is further configured to replace any location-based data received previously at a different location with location-based data received at the present location of the mobile station.

23. A method comprising:
 storing location-based information on a plurality of distributed base station systems of a telecommunications network, the location-based information stored at each base station system being associated with an area in which the base station system is configured to transmit data;
 at each of the plurality of distributed base station systems, transmitting data including the location-based data and user data within the area in which the base station system is configured to transmit data; and
 at a mobile station that does not have an activated data communication session with the telecommunications network, receiving location-based data from at least one of the plurality of distributed base station systems, storing the location-based data, and using the location-based data to provide location-based services to a user of the mobile station; activating a data communication session with the telecommunications network to obtain an identifier associated with the location-based data transmitted by one of the plurality of distributed base station systems within the area whereat the mobile station is located; deactivating the data communication session after obtaining the identifier; and identifying the location-based data associated with the identifier within the data transmitted by the one of the plurality of distributed base station systems transmitting location-based data within the area whereat the mobile station is located.

24. The method of claim 23, wherein the mobile station that does not have an activated data communication session with the telecommunications network is located in a first area in which data is transmitted by a first one of the plurality of distributed base station systems, the method further comprising:
 at the mobile station that does not have an activated data communication session with the telecommunications network, monitoring the data transmitted by the first one of the plurality of distributed base station systems for location-based data and terminating the monitoring after receiving the location based-data from the first one of the plurality of distributed base station systems;
 moving the mobile station that does not have an activated data communication session with the telecommunications network to a second area in which a second different one of the plurality of distributed base station systems is transmitting data; and
 at the mobile station that does not have an activated data communication session with the telecommunications network, monitoring the data transmitted by the second different one of the plurality of distributed base station systems for location-based data.

25. The method of claim 24, further comprising:
 at the mobile station that does not have an activated data communication session with the telecommunications network, replacing the stored location-based data received in the first area from the first one of the plurality of distributed base station systems with location-based data received in the second area from the second different one of the plurality of distributed base station systems.

26. The method of claim 23, further comprising at the mobile station that does not have an activated data communication session with the telecommunications network:

generating a map using the stored location-based data.

27. The method of claim 23, further comprising at the mobile station that does not have an activated data communication session with the telecommunications network:

displaying information about a business using the stored location-based data.

28. The method of claim 23, further comprising at the mobile station that does not have an activated data communication session with the telecommunications network:

providing directions to a destination using the stored location-based data.

\* \* \* \* \*